(12) United States Patent
Chu et al.

(10) Patent No.: US 11,048,348 B1
(45) Date of Patent: Jun. 29, 2021

(54) MOUSE ROLLER MODULE

(71) Applicant: Primax Electronics Ltd., Taipei (TW)

(72) Inventors: Chun-Lin Chu, Taipei (TW); Hsiang-Yu Ou, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/885,547

(22) Filed: May 28, 2020

(30) Foreign Application Priority Data

Apr. 1, 2020 (TW) ................................. 109111314

(51) Int. Cl.
*G06F 3/0362* (2013.01)
*F16H 21/44* (2006.01)
*G06F 3/0354* (2013.01)

(52) U.S. Cl.
CPC ........... *G06F 3/0362* (2013.01); *F16H 21/44* (2013.01); *G06F 3/03543* (2013.01)

(58) Field of Classification Search
CPC .............................. G06F 3/0312; G06F 3/0362
See application file for complete search history.

(56) References Cited

U.S. PATENT DOCUMENTS

2006/0033715 A1\* 2/2006 Chou .................... G06F 3/0362
345/163
2018/0275776 A1\* 9/2018 Li ........................ G06F 3/03543

\* cited by examiner

*Primary Examiner* — Hang Lin
(74) *Attorney, Agent, or Firm* — Kirton McConkie; Evan R. Witt

(57) ABSTRACT

A mouse roller module includes a roller, a swingable rod, an adjusting assembly and a positioning track. When the swingable rod is contacted with the roller at a first location, a first interference force between the swingable rod and the roller is generated. When the swingable rod is swung to a second location, the swingable rod is contacted with the roller at a second location and a second interference force between the swingable rod and the roller is generated. The adjusting assembly includes a protrusion structure. The positioning track includes a first positioning recess and a second positioning recess. When the swingable rod is contacted with the roller at the first location, the protrusion structure is positioned in the first positioning recess. When the swingable rod is contacted with the roller at the second location, the protrusion structure is positioned in the second positioning recess.

9 Claims, 7 Drawing Sheets

MOUSE ROLLER MODULE

FIELD OF THE INVENTION

The present invention relates to a roller structure, and more particularly to a roller structure for an input device.

BACKGROUND OF THE INVENTION

A mouse is used to control a cursor on a computer screen in order to operate the computer. Since 1968, the United States has produced the world's first mouse. After then, the mouse is applied to paper processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-button mouse device is gradually evolved into the modern wireless multi-button roller mouse device. For complying with different industrial needs or personal preferences, various electronic manufacturers have begun to create a variety of mouse device devices with different shapes in order to meet the operation requirements of different users. Consequently, people pay much attention to the comfort and sensitivity of pressing or operating the mouse button (e.g., the left button, the right button or the middle button).

According to the existing design, the roller of the mouse can be rotated forwardly or backwardly to control the movement of the vertical scroll bar in a window operation interface and can be pressed to trigger a switch. However, the conventional mouse roller is only able to provide a single scrolling feel (e.g., a stepless scrolling feel or a lag scrolling feel). That is, the scrolling feel cannot be adjusted by the user. If the user needs a roller with the different scrolling feel, the user has to purchase a new mouse. Since the cost of the conventional mouse is high, the use flexibility and the operating convenience of the mouse are limited. Moreover, if the mouse is not suitable, the working efficiency is deteriorated.

For solving the drawbacks of the conventional technologies, there is a need of providing an improved mouse roller module.

SUMMARY OF THE INVENTION

The present invention provides a mouse roller module. The mouse roller module includes a roller, a swingable rod and an adjusting assembly. The interference force between the swingable rod and the roller is adjusted through the adjusting assembly. The interference force generated between the swingable rod and the roller is adjustable according to the preference or working requirement of the user. Consequently, the roller can be operated in a suitable mode, and the operations of the roller can meet the usage habits of different users.

The other objects and advantages of the present invention will be understood from the disclosed technical features.

In accordance with an aspect of the present invention, a mouse roller module is provided. The mouse roller module includes a roller, a swingable rod, an adjusting assembly and a positioning track. The swingable rod is connected with an elastic element. The elastic element provides an elastic restoring force to the swingable rod. When the swingable rod is contacted with the roller at a first location, a first interference force between the swingable rod and the roller is generated. When the swingable rod is adjusted by the adjusting assembly and swung to a second location, the swingable rod is contacted with the roller at a second location and a second interference force between the swingable rod and the roller is generated. The second interference force is higher than the first interference force. The adjusting assembly includes a protrusion structure. The positioning track is used for guiding the adjusting assembly. The positioning track includes a first positioning recess and a second positioning recess. When the swingable rod is contacted with the roller at the first location, the protrusion structure of the adjusting assembly is positioned in the first positioning recess. When the swingable rod is contacted with the roller at the second location, the protrusion structure of the adjusting assembly is positioned in the second positioning recess.

In an embodiment, the roller includes a lateral surface and a concave structure. The concave structure is concavely formed in the lateral surface. An inner wall of the concave structure as a toothed surface. The toothed surface of the concave structure and the lateral surface are located beside each other. When the swingable rod is at the first location, the swingable rod is contacted with the toothed surface, so that the first interference force is generated between the swingable rod and the toothed surface. When the swingable rod is at the second location, the swingable rod is contacted with the lateral surface, so that the second interference force is generated between the swingable rod and the lateral surface.

In an embodiment, the protrusion structure of the adjusting assembly has a first slant surface, and the each of the first positioning recess and the second positioning recess of the positioning track has a second slant surface. When the protrusion structure is positioned in the first positioning recess or the second positioning recess, the first slant surface is contacted with the second slant surface.

In an embodiment, the swingable rod includes a swinging part, a regulating part and a shaft part. The swinging part is contacted with the roller. The regulating part is contacted with the adjusting assembly. The shaft part is connected between the swinging part and the regulating part. While the regulating part is pushed by the adjusting assembly, the swinging part is swung from the first location to the second location or from the second location to the first second location by using the shaft part as a fulcrum.

In an embodiment, the adjusting assembly includes a movable part, a push part and an operating part. The movable part is movably connected with the positioning track. The movable part includes the protrusion structure. The push part is protruded from the movable part and located beside the roller. The push part is contacted with the regulating part of the swingable rod. When the operating part is moved, the movable part is correspondingly moved along the positioning track. When the operating part is moved in response to an external force and the movable part is correspondingly moved in a first direction, the protrusion structure of the movable part is detached from the first positioning recess of the positioning track and moved to the second positioning recess of the positioning track, and the push part is moved to push the regulating part of the swingable rod. Consequently, the swinging part is swung from the first location to the second location by using the shaft part as the fulcrum. When the operating part is moved in response to the external force and the movable part is correspondingly moved in a second direction opposite to the first direction, the protrusion structure of the movable part is detached from the second positioning recess of the positioning track and moved to the first positioning recess of the positioning track, and the push part is moved to push the regulating part of the swingable rod. Consequently, the swinging part is swung from the second location to the first second location by using the shaft part as the fulcrum.

In an embodiment, the mouse roller module further includes a base member, and the base member includes a first surface, a second surface and a perforation. The first surface and the second surface are opposed to each other. The perforation runs through the first surface and the second surface. The movable part of the adjusting assembly and the positioning track are installed on the first surface of the base member. The operating part of the adjusting assembly is installed on the second surface of the base member. A fixing structure of the operating part is penetrated through the perforation and locked on the movable part. Consequently, the movable part is movably installed on the first surface of the base member.

In an embodiment, the mouse roller module further includes a supporting frame. The supporting frame is installed on the base member, and the roller, the swingable rod and the elastic element are installed on the supporting frame.

In an embodiment, the first positioning recess and the second positioning recess of the positioning track are in a linear arrangement.

In an embodiment, the elastic element is a torsion spring.

From the above descriptions, the present invention provides the mouse roller module. The interference force between the swingable rod and the roller is adjusted through the adjusting assembly. The interference force generated between the swingable rod and the roller is adjustable according to the preference or working requirement of the user. Consequently, the roller can be operated in a suitable mode, and the operations of the roller can meet the usage habits of different users. Due to the cooperation between the protrusion structure of the adjusting assembly and the corresponding recess of the positioning track, the movement of the adjusting assembly along the positioning track can result in the clear tactile feel. Consequently, while the interference force between the swingable rod and the roller is adjusted, the user can clearly realize that the positioning process is completed. Moreover, after the adjusting assembly is moved to the desired location, the adjusting assembly is not readily shifted to other location in response to the external rocking action or other factors.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
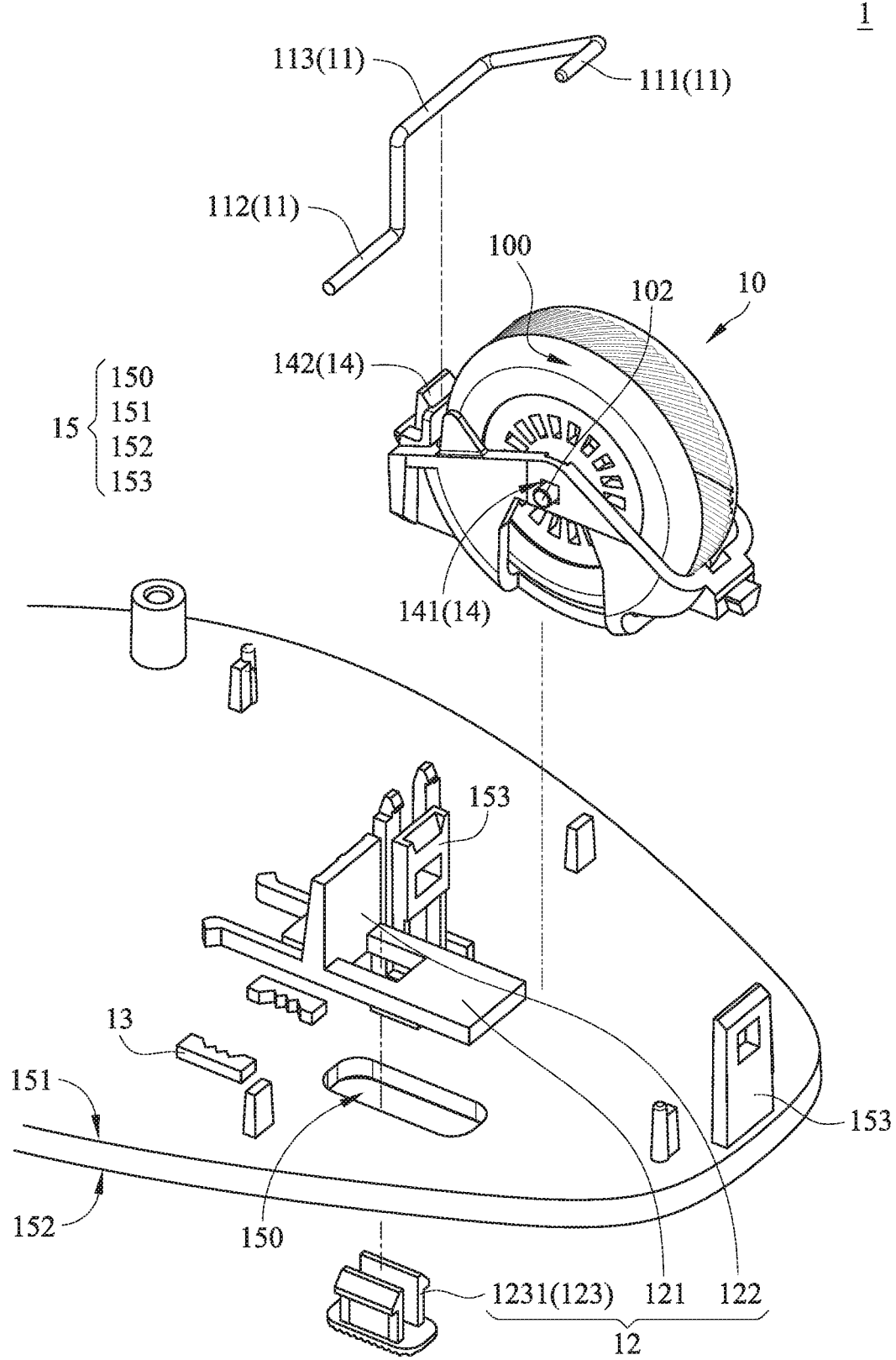
FIG. 1 is a schematic exploded view illustrating a mouse roller module according to an embodiment of the present invention.
Figure 2:
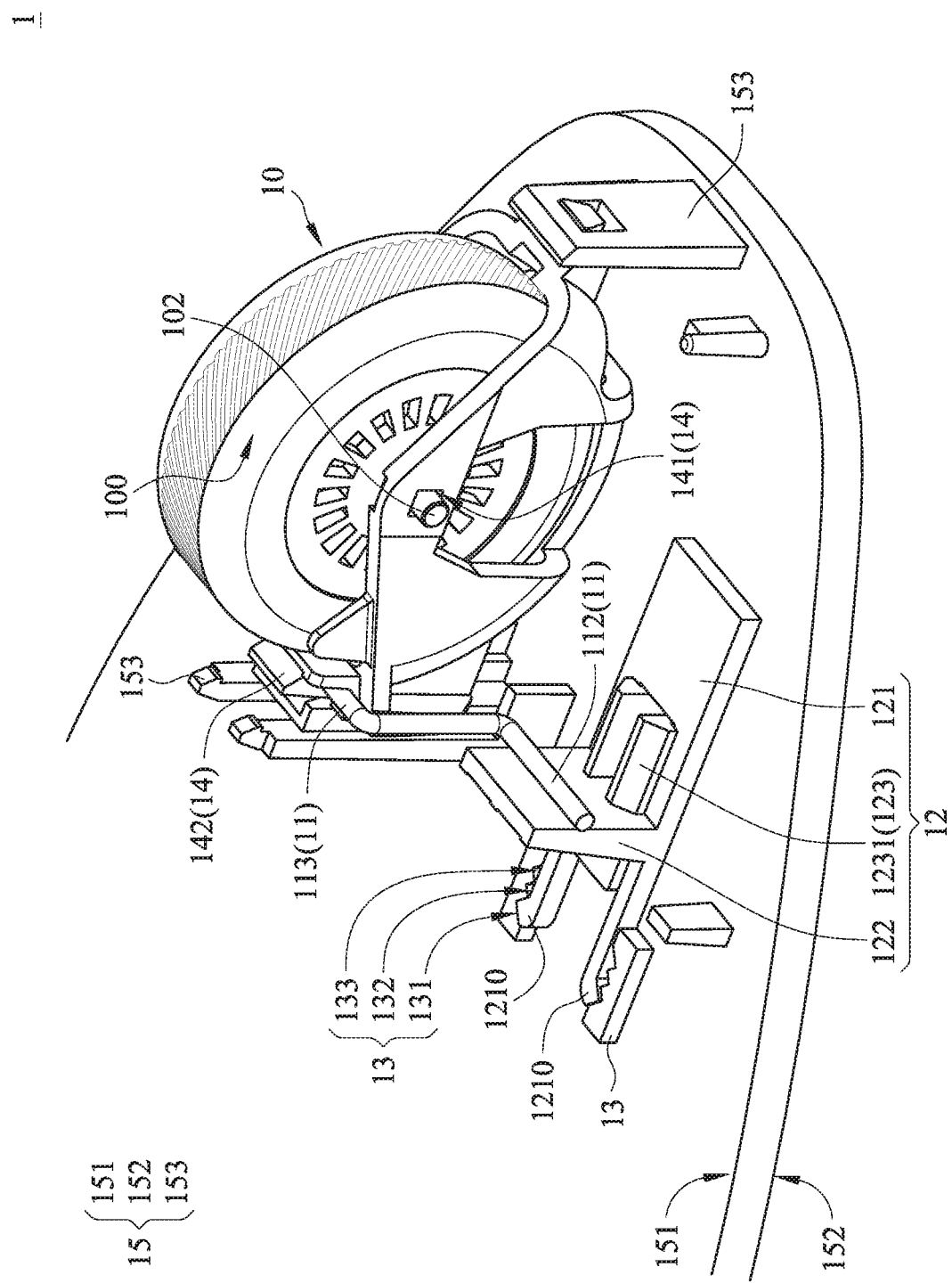
FIG. 2 is a schematic assembled view of the mouse roller module as shown in FIG. 1.
Figure 3:
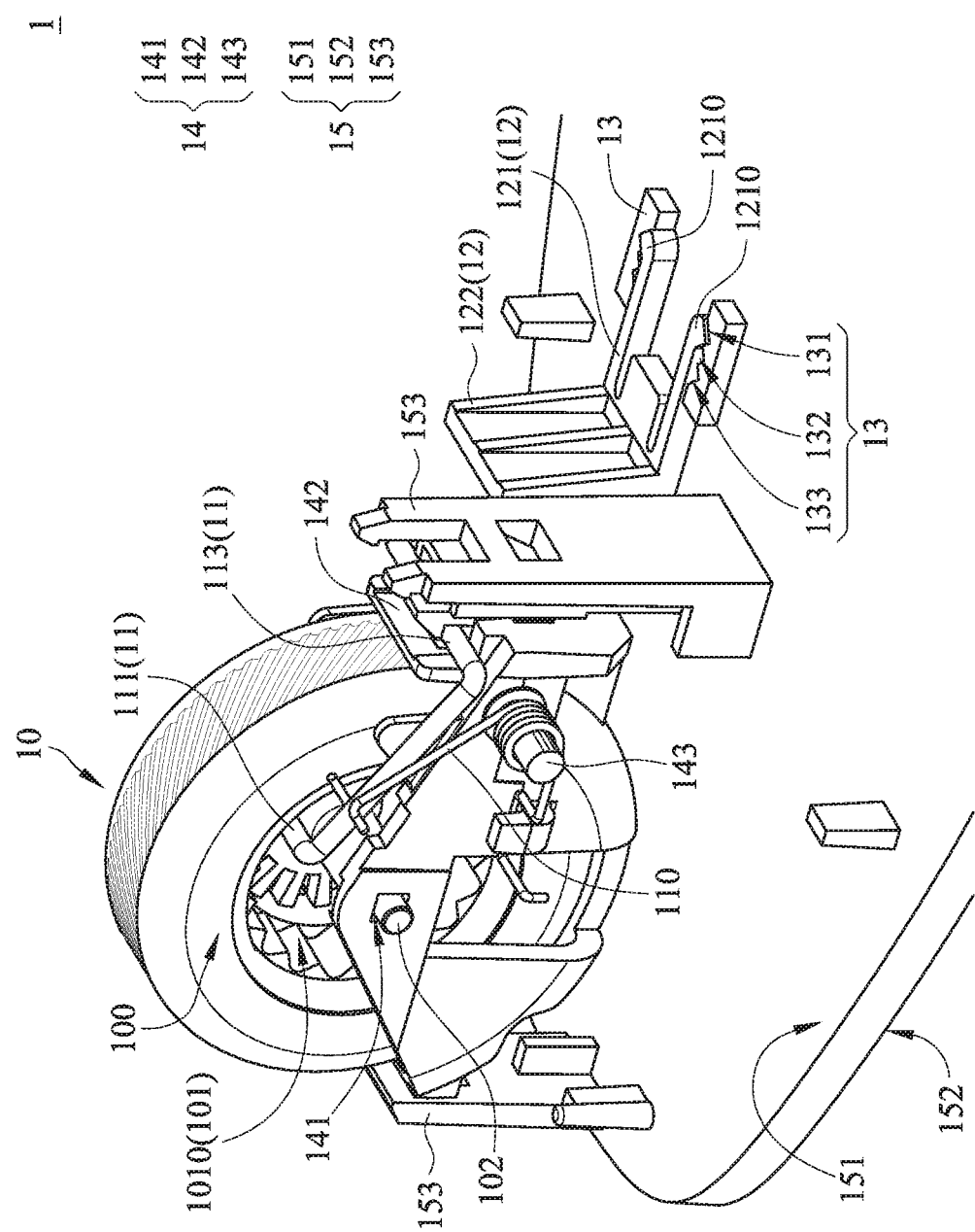
FIG. 3 is a schematic assembled view of the mouse roller module as shown in FIG. 2 and taken along another viewpoint.

Please refer to FIGS. 1, 2 and 3. FIG. 1 is a schematic exploded view illustrating a mouse roller module according to an embodiment of the present invention. FIG. 2 is a schematic assembled view of the mouse roller module as shown in FIG. 1. FIG. 3 is a schematic assembled view of the mouse roller module as shown in FIG. 2 and taken along another viewpoint. In this embodiment, the mouse roller module 1 comprises a roller 10, a swingable rod 11, an adjusting assembly 12, a positioning track 13, a supporting frame 14 and a base member 15.

The swingable rod 11 is connected with an elastic element 110. The elastic element 110 provides an elastic restoring force to the swingable rod 11. In response to the elastic restoring force, the swingable rod 11 is contacted with the roller 10. Preferably but not exclusively, the elastic element 110 is a torsion spring.

The adjusting assembly 12 is used for adjusting the swung location of the swingable rod 11. Consequently, the swingable rod 11 can be swung to another location and contacted with the roller 10.

The positioning track 13 is used for guiding the movement of the adjusting assembly 12. When the adjusting assembly 12 is moved to a target location, the adjusting assembly 12 is positioned by the positioning track 13.

Moreover, the roller 10, the swingable rod 11 and the elastic element 110 are installed on the supporting frame 14. The supporting frame 14, the adjusting assembly 12 and the positioning track 13 are installed on the base member 15. In an embodiment, the supporting frame 14 comprises a pivotal hole 141, a supporting part 142 and a fixed rod 143. A fixed shaft 102 of the roller 10 is penetrated through the pivotal hole 141 of the supporting frame 14. Consequently, the roller 10 can be freely rotated on the supporting frame 14. The swingable rod 11 is installed on the supporting part 142 of the supporting frame 14. The elastic element 110 is installed on the fixed rod 143 of the supporting frame 14.

The base member 15 has a first surface 151 and a second surface 152. The first surface 151 and the second surface 152 are opposed to each other. The base member 15 comprises plural supporting posts 153. The plural supporting posts 153 are protruded from the first surface 151 of the base member 15. The supporting frame 14 is installed on the plural supporting posts 153 and located over the first surface 151 of the base member 15. The supporting frame 14 is movable upwardly or downwardly relative to the first surface 151 of the base member 15. When the supporting frame 14 is moved downwardly, an underlying middle button switch (not shown) is pressed by the supporting frame 14. Consequently, a middle button signal is generated to an electronic device or a computing device that is in communication with the mouse. For example, the electronic device or the computing device is a notebook computer or a personal computer.

The mouse roller module 1 will be described in more details as follows.

Please refer to FIGS. 1, 2 and 3 again. The roller 10 comprises a lateral surface 100 and a concave structure 101.

The concave structure 101 is concavely formed in the lateral surface 100. An inner wall of the concave structure 101 has a toothed surface 1010. The toothed surface 1010 of the concave structure 101 and the lateral surface 100 are located beside each other.

In an embodiment, the swingable rod 11 comprises a swinging part 111, a regulating part 112 and a shaft part 113. The swinging part 111 is contacted with the roller 10. The regulating part 112 is contacted with the adjusting assembly 12. The shaft part 113 is connected between the swinging part 111 and the regulating part 112. The swingable rod 11 is pivotally coupled to the supporting part 142 of the supporting frame 14.

In an embodiment, the adjusting assembly 12 comprises a movable part 121, a push part 122 and an operating part 123. The movable part 121 is movably connected with the positioning track 13. Moreover, the movable part 121 comprises a protrusion structure 1210. The push part 122 is protruded from the movable part 121 and located beside the roller. Moreover, the push part 122 is contacted with the regulating part 112 of the swingable rod 11. When an external force is applied to the operating part 123, the operating part 123 is moved. As the operating part 123 is moved, the movable part 121 is correspondingly moved along the positioning track 13.

In an embodiment, the positioning track 13 comprises a first positioning recess 131 and a second positioning recess 132. When the movable part 121 of the adjusting assembly 12 is guided by the positioning track 13, the movable part 121 of the adjusting assembly 12 can be moved back and forth to a different location As the movable part 121 is moved, the protrusion structure 1210 is correspondingly moved and engaged with the first positioning recess 131 or the second positioning recess 132. Consequently, the movable part 121 is positioned in the corresponding location. Preferably, the first positioning recess 131 and the second positioning recess 132 of the positioning track 13 are in a linear arrangement. Since the movable part 121 of the adjusting assembly 12 is guided by the positioning track 13, the movable part 121 of the adjusting assembly 12 can be moved along a linear direction. Alternatively, the positioning track 13 further comprises a third positioning recess 133. It is noted that the number of the positioning recesses is not restricted. According to the practical requirements, the positioning track 13 comprises at least two positioning recesses.

As shown in FIGS. 1, 2 and 3, the base member 15 further comprises a perforation 150. The perforation 150 runs through the first surface 151 and the second surface 152 of the base member 15. The movable part 121 of the adjusting assembly 12 and the positioning track 13 are installed on the first surface 151 of the base member 15. The operating part 123 of the adjusting assembly 12 is installed on the second surface 152 of the base member 15. Moreover, the operating part 123 comprises a fixing structure 1231. The fixing structure 1231 is protruded upwardly and located beside the roller 10. Particularly, the fixing structure 1231 of the operating part 123 is penetrated through the perforation 150 of the base member 15 and locked on the movable part 121 of the adjusting assembly 12. Consequently, the movable part 121 of the adjusting assembly 12 is movably installed on the first surface 151 of the base member 15.

In accordance with the present invention, the interference force between the swingable rod 11 and the roller 10 is adjusted through the cooperation between the adjusting assembly 12 and the positioning track 13. The operations of the mouse roller module 1 will be described as follows.

Figure 4A:
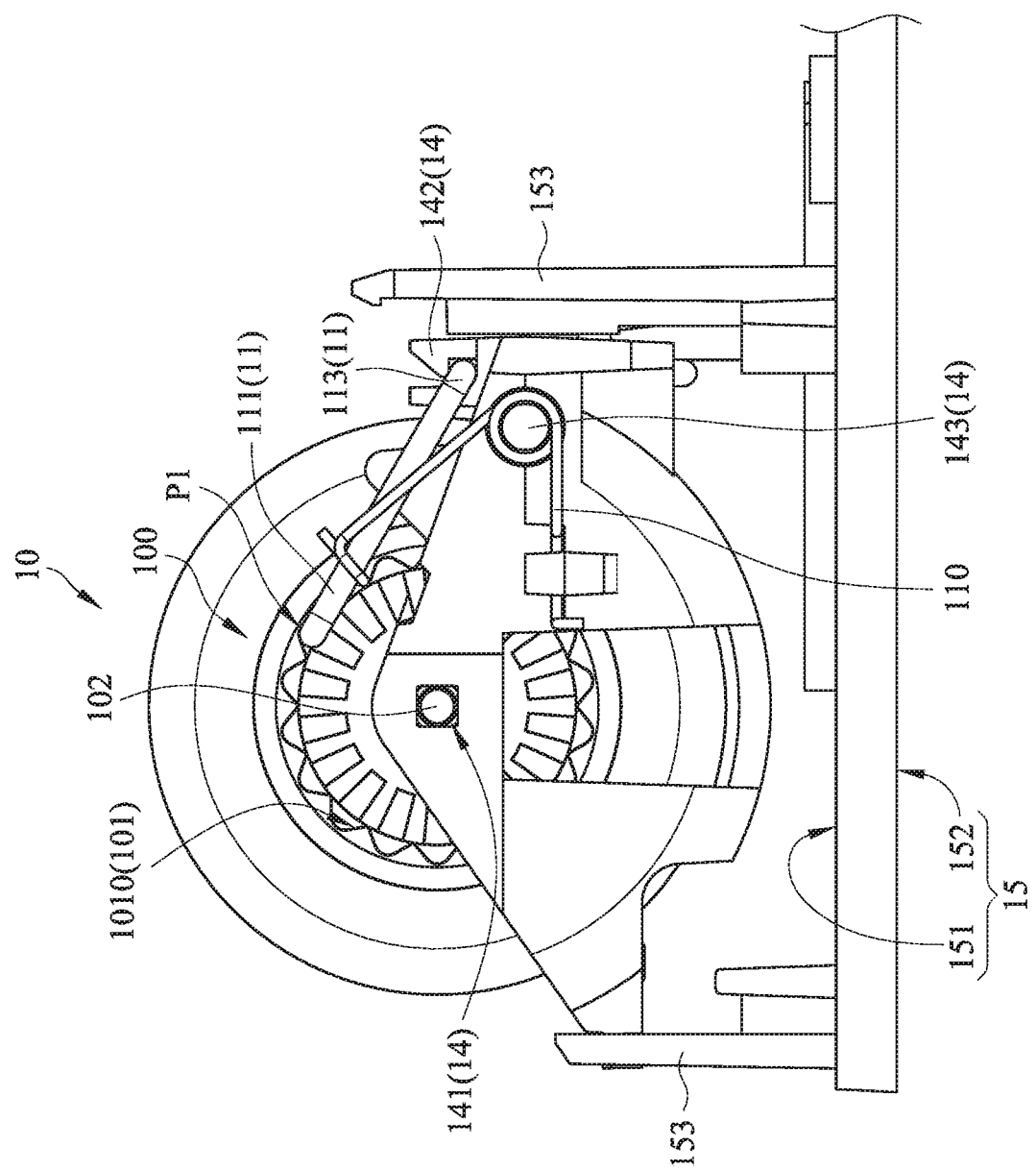
FIG. 4A is a schematic side view illustrating the mouse roller module in a first usage situation.
Figure 4B:
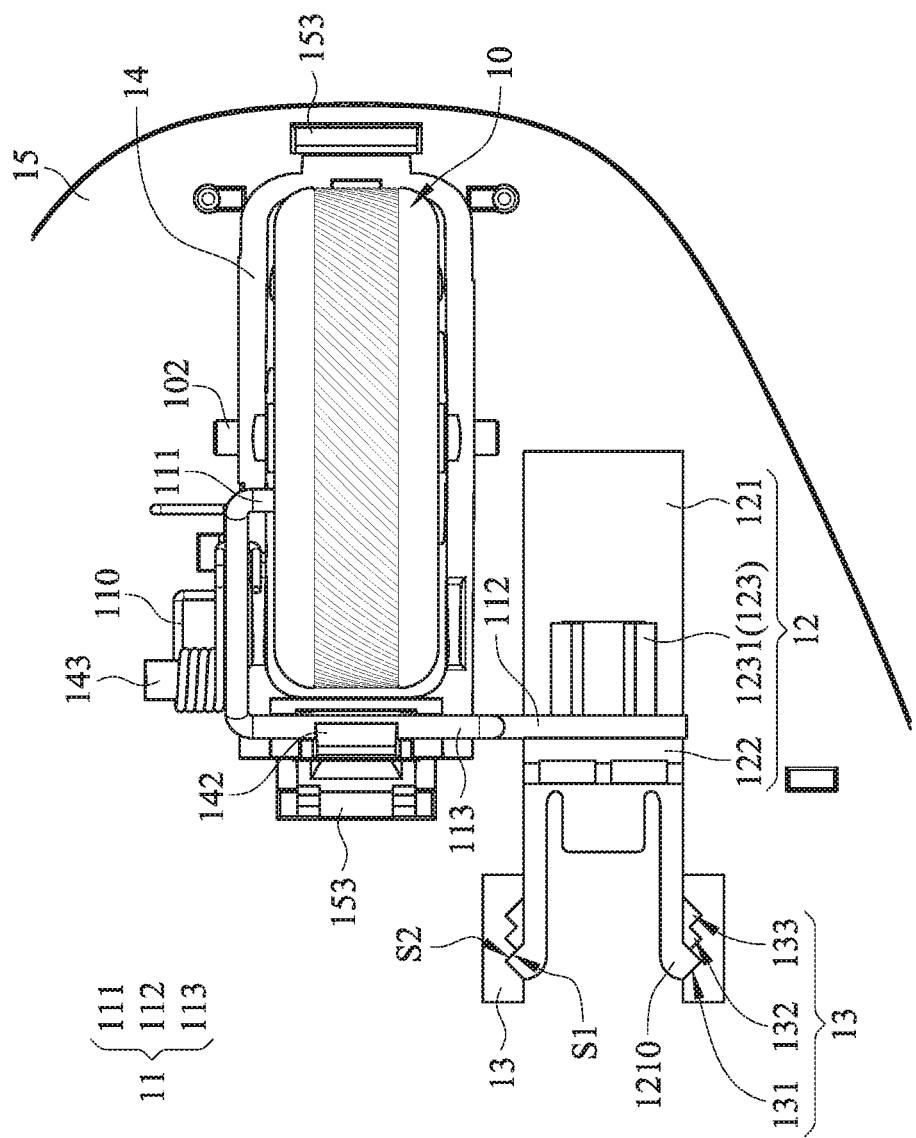
FIG. 4B is a schematic top view illustrating the mouse roller module as shown in FIG. 4A.

Please refer to FIGS. 4A and 4B. FIG. 4A is a schematic side view illustrating the mouse roller module in a first usage situation. FIG. 4B is a schematic top view illustrating the mouse roller module as shown in FIG. 4A. In the first usage situation, the swingable rod 11 is not adjusted by the adjusting assembly 12. That is, the regulating part 112 of the swingable rod 11 is not pushed by the push part 122 of the adjusting assembly 12. Meanwhile, the protrusion structure 1210 of the movable part 121 of the adjusting assembly 12 is engaged with the first positioning recess 131 of the positioning track 13. In addition, the swinging part 111 of the swingable rod 11 is positioned at a first location P1 of the roller 10. That is, the swinging part 111 of the swingable rod 11 is locked on the toothed surface 1010 of the concave structure 101 of the roller 10. Under this circumstance, a first interference force is generated between the swinging part 111 of the swingable rod 11 and the toothed surface 1010 of the roller 10.

Figure 5A:
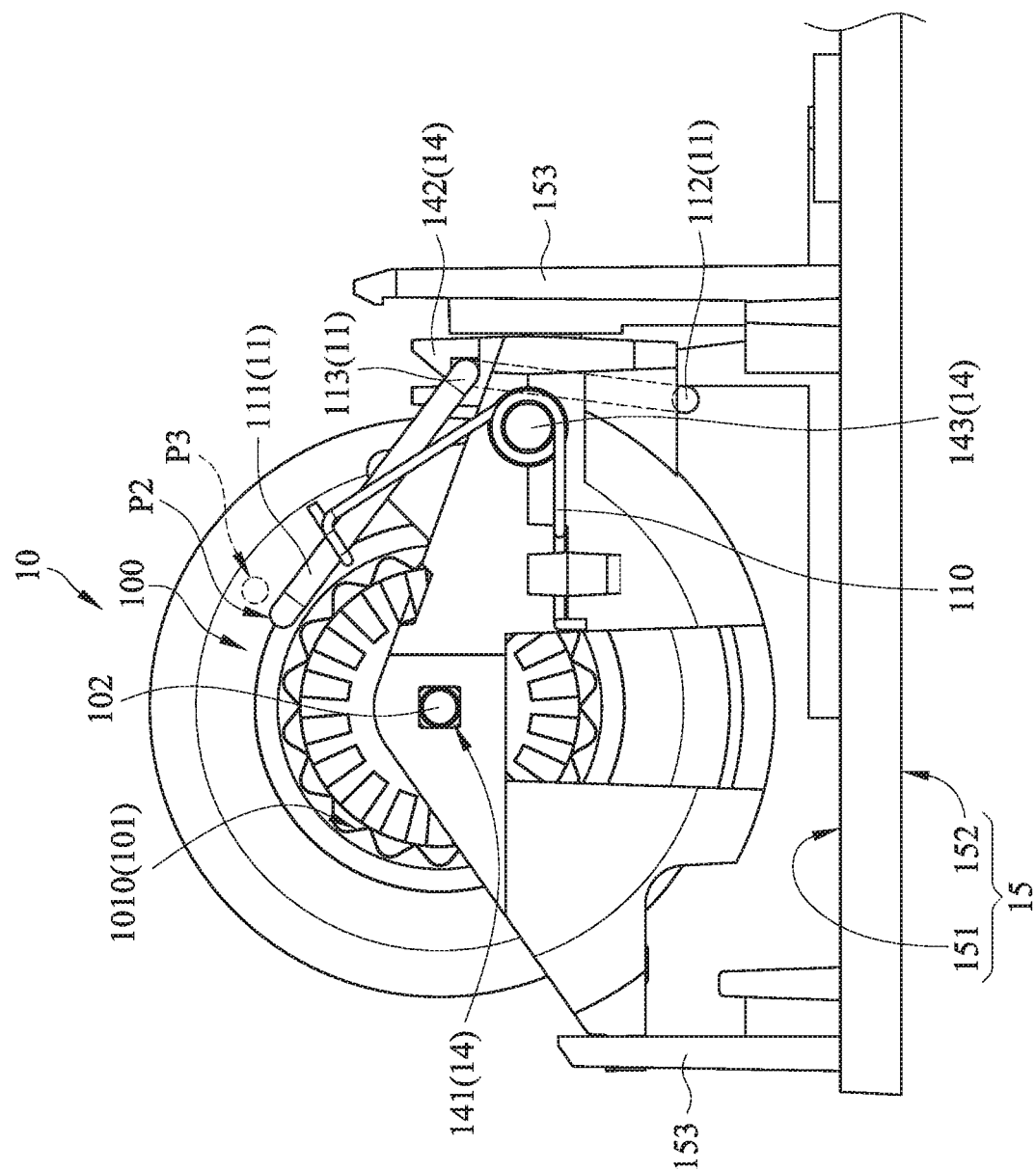
FIG. 5A is a schematic side view illustrating the mouse roller module in a second usage situation.
Figure 5B:
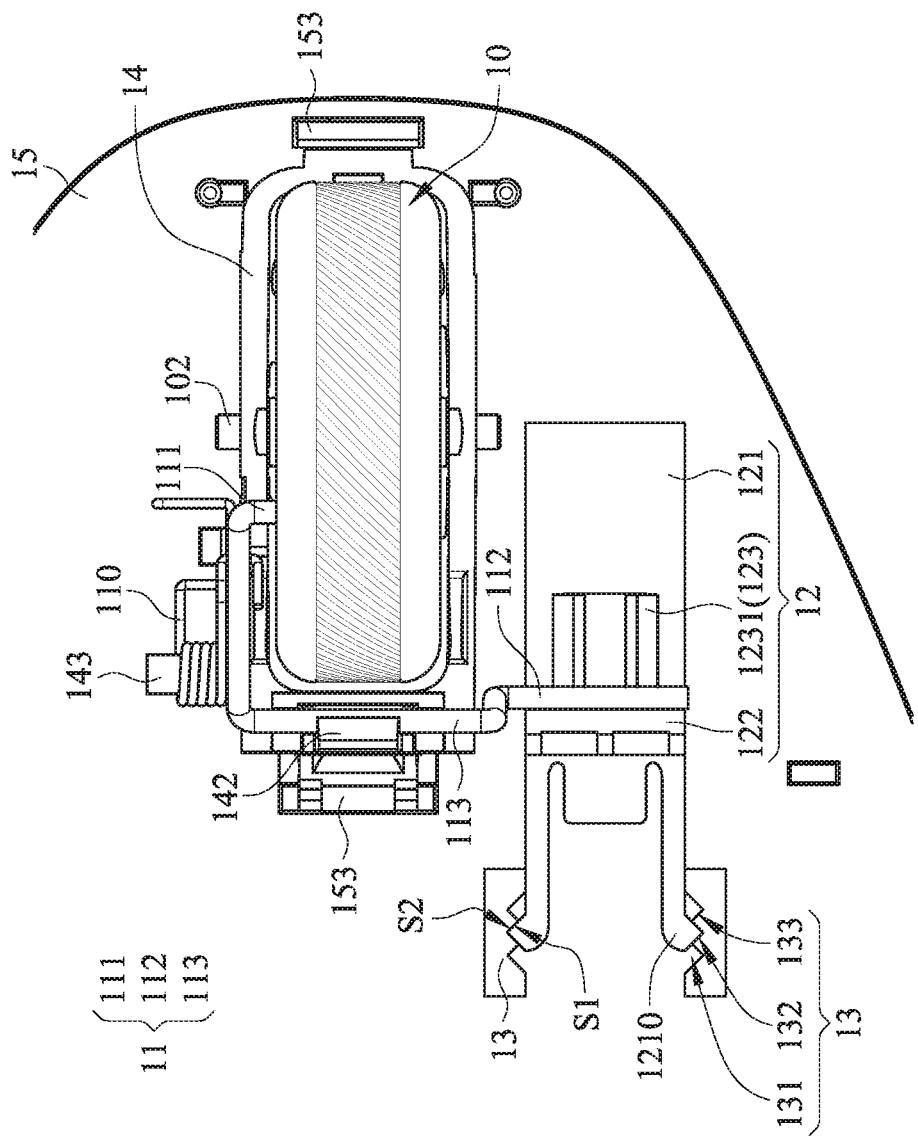
FIG. 5B is a schematic top view illustrating the mouse roller module as shown in FIG. 5A.

Please refer to FIGS. 5A and 5B. FIG. 5A is a schematic side view illustrating the mouse roller module in a second usage situation. FIG. 5B is a schematic top view illustrating the mouse roller module as shown in FIG. 5A. In the second situation, the swingable rod 11 is adjusted by the adjusting assembly 12. When the operating part 123 of the adjusting assembly 12 is moved in response to an external force and the movable part 121 is correspondingly moved in a first direction D1, the protrusion structure 1210 of the movable part 120 is detached from the first positioning recess 131 of the positioning track 13 and moved to the second positioning recess 132 of the positioning track 13. As the movable part 121 is moved, the push part 122 is correspondingly moved to push the regulating part 112 of the swingable rod 11. Consequently, the swinging part 111 of the swingable rod 11 is swung from the first location P1 to a second location P2 by using the shaft part 113 as the fulcrum. Meanwhile, the swinging part 111 of the swingable rod 11 is locked on the lateral surface 100 of the roller 10. Under this circumstance, a second interference force is generated between the swinging part 111 of the swingable rod 11 and the lateral surface 100 of the roller 10. The magnitude of the second interference force is higher than the magnitude of the first interference force.

For adjusting the interference force between the swingable rod 11 and the roller 10 from the first interference force to the second interference force, the user may push the operating part 123 of the adjusting assembly 12 in a second direction D2. The second direction D2 is opposite to the first direction D1. As the operating part 123 of the adjusting assembly 12 is moved in the second direction D2, the movable part 121 is correspondingly moved in the second direction D2. At the same time, the protrusion structure 1210 of the movable part 12 is detached from the second positioning recess 132 of the positioning track 13 and moved to the first positioning recess 131 of the positioning track 13, and the push part 122 is moved to push the regulating part 112 of the swingable rod 11. Consequently, the swinging part 111 of the swingable rod 11 is swung from the second location P2 to the first second location P1 of the roller 10 by using the shaft part 113 as the fulcrum. In other words, the swinging part 111 of the swingable rod 11 is locked on the toothed surface 1010 of the concave structure 101 of the roller 10 (see FIGS. 4A and 4B).

In an embodiment, the protrusion structure 1210 of the movable part 121 has a first slant surface 51, and the each of the first positioning recess 131 and the second positioning recess 132 of the positioning track 13 has a second slant surface S2. When the protrusion structure 1210 of the movable part 120 is moved from the first positioning recess 131 to the second positioning recess 132 or moved from the second positioning recess 132 to the first positioning recess 131, the first slant surface 51 of the protrusion structure 1210 is contacted with the second slant surface S2 of the first positioning recess 131 or the second positioning recess 132. Consequently, the protrusion structure 1210 of the movable part 12 can be effectively engaged with and positioned in the first positioning recess 131 or the second positioning recess 132.

In case that the positioning track 13 further comprises the third positioning recess 133, the movable part 121 can continuously be moved in the first direction D1 in response to the external force on the operating part 123 of the adjusting assembly 12. Consequently, after the protrusion structure 1210 of the movable part 120 is moved from the first positioning recess 131 of the positioning track 13 to the second positioning recess 132 of the positioning track 13, the protrusion structure 1210 of the movable part 120 can be detached from the second positioning recess 132 of the positioning track 13 and moved to the third positioning recess 133 of the positioning track 13. As the movable part 121 is moved, the push part 122 is correspondingly moved to push the regulating part 112 of the swingable rod 11. Consequently, the swinging part 111 of the swingable rod 11 is swung from the second location P2 to a third location P3 by using the shaft part 113 as the fulcrum. Both of the third location P3 and the second location P2 are located at the lateral surface 100 of the roller 10. However, the third location P3 is at a higher level than the second location P2. As shown in the above drawings, the lateral surface 100 of the roller 10 is an inclined surface that is inclined downwardly from an outer side to an inner side. When the swinging part 111 of the swingable rod 11 is locked on the lateral surface 100 of the roller 10 at the third location P3, a third interference force is generated between the swinging part 111 of the swingable rod 11 and the lateral surface 100 of the roller 10. The magnitude of the third interference force is higher than the magnitude of the second interference force.

From the above descriptions, the present invention provides the mouse roller module. The interference force between the swingable rod and the roller is adjusted through the adjusting assembly. The interference force generated between the swingable rod and the roller is adjustable according to the preference or working requirement of the user. Consequently, the roller can be operated in a suitable mode, and the operations of the roller can meet the usage habits of different users. Due to the cooperation between the protrusion structure of the adjusting assembly and the corresponding recess of the positioning track, the movement of the adjusting assembly along the positioning track can result in the clear tactile feel. Consequently, while the interference force between the swingable rod and the roller is adjusted, the user can clearly realize that the positioning process is completed. Moreover, after the adjusting assembly is moved to the desired location, the adjusting assembly is not readily shifted to other location in response to the external rocking action or other factors.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse roller module, comprising:
    a roller;
    a swingable rod connected with an elastic element, wherein the elastic element provides an elastic restoring force to the swingable rod, wherein when the swingable rod is contacted with the roller at a first location, a first interference force between the swingable rod and the roller is generated;
    an adjusting assembly, wherein when the swingable rod is adjusted by the adjusting assembly and swung to a second location, the swingable rod is contacted with the roller at a second location and a second interference force between the swingable rod and the roller is generated, wherein the second interference force is higher than the first interference force, and the adjusting assembly comprises a protrusion structure; and
    a positioning track guiding the adjusting assembly, and comprising a first positioning recess and a second positioning recess, wherein when the swingable rod is contacted with the roller at the first location, the protrusion structure of the adjusting assembly is positioned in the first positioning recess, wherein when the swingable rod is contacted with the roller at the second location, the protrusion structure of the adjusting assembly is positioned in the second positioning recess.

2. The mouse roller module according to claim 1, wherein the roller comprises a lateral surface and a concave structure, wherein the concave structure is concavely formed in the lateral surface, an inner wall of the concave structure as a toothed surface, and the toothed surface of the concave structure and the lateral surface are located beside each other, wherein when the swingable rod is at the first location, the swingable rod is contacted with the toothed surface, so that the first interference force is generated between the swingable rod and the toothed surface, wherein when the swingable rod is at the second location, the swingable rod is contacted with the lateral surface, so that the second interference force is generated between the swingable rod and the lateral surface.

3. The mouse roller module according to claim 1, wherein the protrusion structure of the adjusting assembly has a first slant surface, and the each of the first positioning recess and the second positioning recess of the positioning track has a second slant surface, wherein when the protrusion structure is positioned in the first positioning recess or the second positioning recess, the first slant surface is contacted with the second slant surface.

4. The mouse roller module according to claim 1, wherein the swingable rod comprises:
    a swinging part contacted with the roller;
    a regulating part contacted with the adjusting assembly, and
    a shaft part connected between the swinging part and the regulating part,
    wherein while the regulating part is pushed by the adjusting assembly, the swinging part is swung from the first location to the second location or from the second location to the first second location by using the shaft part as a fulcrum.

5. The mouse roller module according to claim 4, wherein the adjusting assembly comprises:

a movable part movably connected with the positioning track, wherein the movable part comprises the protrusion structure;

a push part protruded from the movable part and located beside the roller, wherein the push part is contacted with the regulating part of the swingable rod; and an operating part, wherein when the operating part is moved, the movable part is correspondingly moved along the positioning track, wherein when the operating part is moved in response to an external force and the movable part is correspondingly moved in a first direction, the protrusion structure of the movable part is detached from the first positioning recess of the positioning track and moved to the second positioning recess of the positioning track, and the push part is moved to push the regulating part of the swingable rod, so that the swinging part is swung from the first location to the second location by using the shaft part as the fulcrum, wherein when the operating part is moved in response to the external force and the movable part is correspondingly moved in a second direction opposite to the first direction, the protrusion structure of the movable part is detached from the second positioning recess of the positioning track and moved to the first positioning recess of the positioning track, and the push part is moved to push the regulating part of the swingable rod, so that the swinging part is swung from the second location to the first second location by using the shaft part as the fulcrum.

6. The mouse roller module according to claim 5, wherein the mouse roller module further comprises a base member, and the base member comprises a first surface, a second surface and a perforation, wherein the first surface and the second surface are opposed to each other, the perforation runs through the first surface and the second surface, the movable part of the adjusting assembly and the positioning track are installed on the first surface of the base member, and the operating part of the adjusting assembly is installed on the second surface of the base member, wherein a fixing structure of the operating part is penetrated through the perforation and locked on the movable part, so that the movable part is movably installed on the first surface of the base member.

7. The mouse roller module according to claim 6, wherein the mouse roller module further comprises a supporting frame, wherein the supporting frame is installed on the base member, and the roller, the swingable rod and the elastic element are installed on the supporting frame.

8. The mouse roller module according to claim 1, wherein the first positioning recess and the second positioning recess of the positioning track are in a linear arrangement.

9. The mouse roller module according to claim 1, wherein the elastic element is a torsion spring.

* * * * *